(12) United States Patent
Estève et al.

(10) Patent No.: US 9,513,746 B2
(45) Date of Patent: Dec. 6, 2016

(54) TOUCH SENSITIVE DISPLAY WITH ACOUSTIC ISOLATION

(71) Applicant: Elo Touch Solutions, Inc., Milpitas, CA (US)

(72) Inventors: Simon Estève, Rambouillet (FR); Olivier Schevin, La Plaine Saint Denis (FR)

(73) Assignee: Elo Touch Solutions, Inc., Milpitas, CA (US)

( * ) Notice: Subject to any disclaimer, the term of this patent is extended or adjusted under 35 U.S.C. 154(b) by 253 days.

(21) Appl. No.: 13/955,802

(22) Filed: Jul. 31, 2013

(65) Prior Publication Data

US 2014/0035881 A1    Feb. 6, 2014

(30) Foreign Application Priority Data

Jul. 31, 2012   (EP) .................................... 12290262
Jul. 31, 2012   (EP) .................................... 12290263

(51) Int. Cl.
 *G06F 3/043*       (2006.01)

(52) U.S. Cl.
 CPC ........... *G06F 3/0436* (2013.01); *G06F 3/0433* (2013.01)

(58) Field of Classification Search
 CPC ..................... G06F 3/0433; G06F 2203/04103
 See application file for complete search history.

(56) References Cited

U.S. PATENT DOCUMENTS

| | | | | |
|---|---|---|---|---|
| 5,017,913 A | * | 5/1991 | Kaneko | G06F 3/0433 345/177 |
| 5,491,305 A | * | 2/1996 | Kawakami | G06F 3/0433 178/18.04 |
| 6,532,152 B1 | * | 3/2003 | White | G02F 1/133308 312/223.1 |
| 7,345,677 B2 | | 3/2008 | Ing et al. | |

(Continued)

FOREIGN PATENT DOCUMENTS

| | | |
|---|---|---|
| FR | 2841022 A1 | 12/2003 |
| TW | 2008/29095 A | 7/2008 |
| WO | WO-2009/007010 A1 | 1/2009 |

OTHER PUBLICATIONS

European Search Report for Application No. EP 12 29 0262, dated Jan. 14, 2013.

*Primary Examiner* — Ilana Spar
*Assistant Examiner* — Mihir K Rayan
(74) *Attorney, Agent, or Firm* — Alston & Bird LLP

(57) ABSTRACT

Provided is a touch sensitive display, for integration into an electronic device configured to function in a predetermined temperature range, comprising a display panel and an acoustic isolating means. The acoustic isolating means is configured and arranged such that it presents a damping ratio of 5% or less with a variation of this damping ratio of 2 percentage points or less in the predetermined temperature range. Also provided is a touch sensitive display comprising a display panel and an acoustic isolating means. The acoustic isolating means comprises an elastic material in a first region on the front side of the display panel, with the front main side of the display panel being the displaying side, and an elastic material in a second region on the back side of the display panel and a compression controlling means for compressing the first and/or second region by a predetermined amount.

21 Claims, 6 Drawing Sheets

(56) References Cited

U.S. PATENT DOCUMENTS

| | | | |
|---|---|---|---|
| 8,774,876 B2* | 7/2014 | Ozasa | H04M 1/0266 345/156 |
| 2001/0033272 A1* | 10/2001 | Yoshimura | G06F 3/0433 345/173 |
| 2007/0165009 A1* | 7/2007 | Sakurai | G06F 3/0436 345/177 |
| 2008/0158498 A1* | 7/2008 | Chang | G02F 1/133305 349/158 |
| 2008/0316184 A1* | 12/2008 | D'Souza | G06F 3/0418 345/173 |
| 2010/0276215 A1* | 11/2010 | Duheille | G06F 3/0416 178/18.04 |
| 2011/0234545 A1* | 9/2011 | Tanaka | G06F 3/0436 345/177 |
| 2011/0255726 A1* | 10/2011 | Yu et al. | 381/332 |
| 2011/0291996 A1* | 12/2011 | Gao | G06F 3/0436 345/177 |
| 2012/0242588 A1* | 9/2012 | Myers et al. | 345/173 |
| 2012/0319975 A1* | 12/2012 | Fuchs et al. | 345/173 |
| 2013/0064401 A1* | 3/2013 | Wang | G06F 3/016 381/191 |
| 2013/0127770 A1* | 5/2013 | Trend | G06F 3/044 345/174 |

* cited by examiner

TOUCH SENSITIVE DISPLAY WITH ACOUSTIC ISOLATION

CROSS-REFERENCE TO RELATED APPLICATIONS

This application claims priority to European Patent Application No. 12290263.8, filed Jul. 31, 2012, and European Patent Application No. 12290262.0, filed Jul. 31, 2012, the entire contents each of which are incorporated herein by reference.

FIELD

The invention relates to a touch sensitive display comprising a display panel, at least one acoustic wave sensing means, and an acoustic isolating means. The invention furthermore relates to an electronic device comprising such a touch sensitive display.

BACKGROUND

Touch sensitive displays are becoming more and more popular, in particular with handheld mobile devices. Various competing technologies exist. One of these technologies is based on the analysis of acoustic waves travelling in the user interaction interface following or during a touch of the interface by a user. The acoustic waves are sensed by appropriate sensors, e.g. piezoelectric sensors, and the sensed signals are analyzed to determine the position of the touch. This technology is for instance known from FR2841022.

To be able to identify the location of a touch by a user, the sensed signal is typically compared to a set of reference signals. To ensure the repeatability of the analysis across mass produced devices, it is important to acoustically isolate the user interaction surface from its environment. It appeared, however, that it is not easy to integrate the technology into a mass produced product. To be able to determine the touch position in a reliable and precise way, it is necessary to calibrate the algorithm to each product or to work with high integration constraints making the devices expensive.

SUMMARY

It is therefore an object of the present invention to provide a touch sensitive display which overcomes at least some of the above mentioned problems in the art.

This object is achieved with the touch sensitive display according to claim 1. The inventive touch sensitive display comprises a display panel, at least one acoustic wave sensing means, and an acoustic isolating means. The inventive touch sensitive display may be integrated into an electronic device configured to function in a predetermined temperature range. According to an embodiment of the invention, the touch sensitive display is characterized in that the acoustic isolating means is configured and arranged such that it presents a damping ratio of 5% or less, in particular 2% or less, with a variation of this damping ratio of 2 percentage point (pp) or less in the predetermined temperature range. A percentage point (pp) is the unit for the arithmetic difference of two percentages. The acoustic isolation means may be configured and arranged such that its dynamic stiffness has a variation of 2% or less in a predetermined temperature range.

By choosing the design and the material of the acoustic isolating means such that it has stable acoustic properties in temperature and by incorporating it into the touch sensitive display, the integration constraints may be lowered, as the touch position may be determined with one fixed algorithm independent in temperature and the acoustic isolation is already provided by the display itself so that a device manufacturer may simply include the display into its fabrication chain.

The damping ratio and the dynamic stiffness may be estimated using transmissibility measurements. The damping ratio of the acoustic isolating means according to an embodiment of the invention is inferior to 5% to allow acoustic wave propagation in the display panel and, according to an embodiment of the invention, may present only a small variation of less than 2 pp across the desired functional temperature range. The dynamic stiffness is designed to provide improved acoustic isolation in the frequency band used by the touch localization algorithm and, according to an embodiment of the invention, may present only small variation (less than 2%) across the desired temperature range. Materials satisfying this constraint are for instance thermoset materials.

According to an embodiment of the invention, the predetermined temperature range may be at least from 0° C. up to 50° C., more in particular at least from −25° C. up to 85° C. This is a typical temperature range in which consumer electronic devices work.

The acoustic isolating means may comprise one or more first fixing means for fixing the display to the acoustic isolating means. By using dedicated fixing means, the display panel and the acoustic isolating means may be attached together without the need of using an adhesive, like glue or stick tape, thereby simplifying the assembly of the touch sensitive display.

The fixing means may be one of a hook, a clamp, or a bracket and at least one fixing means may be provided per edge and/or corner of the display panel. Using this arrangement the display panel may be fixed in a stable manner in the plane of the display. In addition, it remains possible to disassemble the two parts. Furthermore, by providing a clearance adapted to the thickness of the display panel, the positioning of the display panel is also secured in the direction perpendicular to the plane of the display.

According to another embodiment of the invention, the size of the acoustic wave sensing means may essentially at least match the size of the back main side of the display panel, with the front main side of the display panel being the displaying side, and may comprise one or more recess regions or holes for accommodating the at least one acoustic wave sensing means which is/are in contact with the back main side of the display panel. By providing the acoustic isolating means essentially over the entire back side of the display panel, the necessary stiffness may be provided so that thin glass display panels may be protected against shocks and bending constraints.

According to another embodiment of the invention, the acoustic isolating means may furthermore comprise secondary fixing means, in particular through holes in an area of the isolating means projecting away, in particular projecting laterally away, from the back mains side display panel, for attaching the touch sensitive display to an additional component, in particular a printed circuit board. The secondary fixing means may simplify the integration process of the touch sensitive panel into the electronic device.

According to yet another embodiment of the invention, the acoustic isolating means may comprise a plurality of bumps, in particular spikes on the side facing the display panel. The presence of the bumps or spikes will reduce the contact area between the display panel and the acoustic isolating means thereby reducing damping of acoustic waves travelling inside the display panel.

The bumps may touch the display panel at least in its edge region and preferably also in its center region. With this arrangement, the contact area may be kept low but at the same time the position of the display panel is secured and won't move upon a user's contact with the display panel.

According to another embodiment of the invention, the acoustic isolating means may be at least partially made out of a silicone material. Silicone materials may provide the desired properties of mechanical stability in the desired temperature range on its own. In an appropriate design, for instance when using bumps or spikes like in the embodiment described above, a silicone acoustic isolation means may provide the acoustic isolation according to an embodiment of the invention and furthermore provide mechanical stiffness. The acoustic isolating means may be molded as a single workpiece.

The acoustic isolating means may comprise one or more regions with a two or three dimensional spacer textile. Spacer textiles, like for example the material distributed under the trademark Deflexion™ of Dow Corning, may provide desired stiffness at low weight.

The acoustic isolating means may be made out of one single molded silicone work piece. This may simplify the production of the acoustic isolating means itself, as it may be mass produced, and furthermore the assembly will be simplified.

The acoustic isolating means may comprise stiffening elements made out of any one of a metal, in particular aluminum, a polycarbonate material, a Polyether ether ketone (PEEK) material, or a combination including any one or more thereof. These materials may provide the desired stiffness and may be combined with a silicone material. In particular, a metal, polycarbonate, or PEEK sheet with a plurality of bumps towards the back side of the display panel may form the acoustic isolating means with the stiffening functionality.

An embodiment of the invention may comprise one or more spacers attached to or incorporated into the acoustic isolating means with one extremity of the one or more spacer being flush aligned with the front side of the display panel or protruding perpendicular to the front side of the display by a predetermined amount. During assembly of the touch sensitive panel into the desired electronic device, the spacers may fix the external dimensions of the device even in the case of a plastic housing which is less stiff and might bend in the absence of such spacers. Typically, spacers may have dimensional tolerances of plus/minus 0.1 mm, whereas a plastic frame of a housing of an electronic device will have tolerances of the order of plus/minus 0.6 mm. The plurality of spacers may be positioned over the entire circumference of the display panel.

The one or more spacer may be positioned inside the one or more first fixing means. In this case the spacers may also fulfill the stiffening role of the acoustic isolating means.

The one or more spacer may be made out of any one of a metal, in particular aluminum, a polycarbonate material, a Polyether ether ketone (PEEK) material, or a combination including any one or more thereof. These materials provide the necessary stiffness. Furthermore, the use of a metal may be advantageous in case the spacer is integrated into the fixing means, which may simplify the molding process of the silicone.

The object of the invention to provide a touch sensitive display which overcomes at least some of the above mentioned problems in the art is also achieved with a touch sensitive display for integration into an electronic device configured to function in a predetermined temperature range. The touch sensitive display comprises a display panel, at least one acoustic wave sensing means, and an acoustic isolating means, wherein the acoustic isolating means comprises an elastic material, in particular a foam, more in particular a silicone foam, in a first region on the front side of the display panel, with the front main side of the display panel being the displaying side and an elastic material, in particular a foam, more in particular a silicone foam, in a second region on the back side of the display panel and a compression controlling means for compressing the first and/or second region by a predetermined amount. Providing a compression controlling means may have the advantage that the compression of the two regions may be controlled for a plurality of products during their fabrication, by which the tolerances of the assembly may be improved. The silicone foam may be a material distributed under the trademark Bisco® of Rogers Corporation with reference HT800. The touch sensitive display may be combined with any features as described above.

According to an embodiment of the invention, the compression controlling means may be a frame attached, in particular using an adhesive or screws, to the acoustic isolation means in the first or second region and extending at least partially beyond the edge of the display panel. The frame may protect the display against breakage under bending constraints. The frame may be composed of a plurality of parts and may even be discontinuous.

According to an embodiment of the invention, the compression controlling means may be part of a housing shell into which the display panel with the acoustic isolation means and the acoustic wave sensing means are positioned such that the first and second region get compressed in a predetermined way. The housing shell into which the other elements may be introduced, e.g. by sliding the display panel with the acoustic isolating means into the housing, will enforce the assembly and protect the display against bending constraints and shocks.

According to another embodiment of the invention, the acoustic isolation means in the first region and in the second region may be compressed between the housing shell and the display panel respectively without being attached to the display panel. Thus, no adhesive may be necessary to assemble the stack of elements; thereby the temperature stability may be improved. Furthermore disassembly of the stack may be simplified so that a broken display may be exchanged.

The object of the invention to provide a touch sensitive display which overcomes at least some of the above mentioned problems in the art is also achieved with an embodiment of a touch sensitive display comprising a display panel, at least one acoustic wave sensing means, and an acoustic isolating means, wherein the acoustic isolating means comprises one or more moulded parts into which the display panel is frictionally engaged. By providing an isolating means into which the display panel may be engaged, the display panel may be positioned accurately, thereby ensuring repeatability of the position determining in a mass product without the need of calibrating each device, and, furthermore, the assembly may not need any adhesives, which may not exhibit the desired temperature stability in the desired range. Furthermore disassembly may be simplified. This embodiment may be combined with any one of the particular features described above.

Preferably, the display panel may be one of an electrophoretic display (EPD) panel, an LCD display panel, an OLED display panel, a plasma display panel, and any rigid material in which acoustic waves may propagate (for example, glass, plastic metal, wood, . . . ). Indeed, the invention may also be extended to user interaction interfaces without a display.

The object of the invention is also achieved with the electronic device comprising a touch sensitive display according to any one of the embodiments described above and a printed circuit board. Using a touch sensitive display according to an embodiment of the invention, one may take advantage of touch sensitive device based on the analysis of acoustic signals as the necessary acoustic isolation may be achieved and, at the same time, the integration constraints may be lowered by using an acoustic isolation means with stable acoustic properties in the desired temperature range.

According to an embodiment of the invention, the touch sensitive display may be fixed to the printed circuit board with at least one of screws, clips, or rivets using the secondary fixing means. Thus, the device may be assembled and disassembled easily, and the display, which is usually the most expensive part of such a device, may be replaced in case of a failure.

According to another embodiment of the invention, the electronic device may comprise a cover frame, in particular a plastic or metal frame fixed to the printed circuit board and enclosing the display panel, and an acoustic isolating means. Advantageously, the cover frame may touch the extremity/extremities of the one or more spacer used in one particular embodiment of the inventive touch sensitive display. As already mentioned above, the spacers may ensure the external dimension of the electronic device even in cases where the tolerances of the cover frame are larger.

According to yet another embodiment of the invention, the electronic device may further comprise a seal between the cover frame and the display panel. This may prevent dust or moisture from entering into the device.

The cover frame may be in contact with the frame of the compression controlling means to thereby compress the first region and the second region of the acoustic isolation means by the predetermined amount. Thus, even in the presence of a soft acoustic isolating means, the desired stiffness of the assembly may be obtained.

The electronic device may be one of an electronic reader, a mobile phone, a personal assistant, a computer, or a TV set.

BRIEF DESCRIPTION OF THE DRAWINGS

The invention and its particular advantageous will be described in more detail with respect to embodiments illustrated in the following figures.

DETAILED DESCRIPTION

Figure 1:
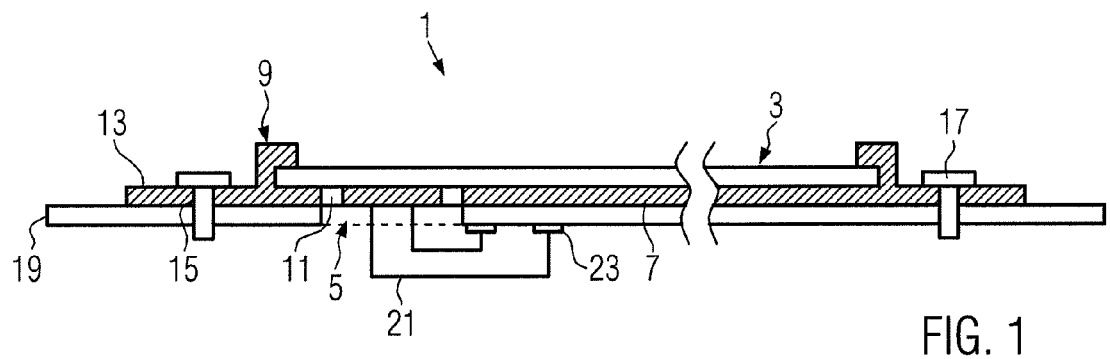
FIG. 1 illustrates a schematic side cut view of a touch sensitive display according to a first embodiment fixed to a printed circuit board (PCB).

FIG. 1 illustrates a schematic side cut view of a touch sensitive display 1 according to a first embodiment of the invention. The touch sensitive display 1 comprises a display panel 3, which may be an electrophoretic display (EPD) like used in e-readers, an LCD display panel, an OLED display panel, or a plasma display panel, or any rigid material where touch localization is desired. The touch sensitive display 1 furthermore comprises at least one acoustic wave sensing means 5, which may be a piezoelectric transducer or the like transforming an acoustic wave into an electric signal. The acoustic wave sensing means 5 is attached to the back main side of the display panel 5. In FIG. 1, the front main side, which is the displaying side of the display panel, is facing towards the top of the page. In other embodiments of the invention, the acoustic wave sensing means 5 may alternatively be attached to the front main side of the display panel 3.

The display panel 3 is fixed to an acoustic isolating means 7 which isolates acoustically the display panel 3 from the environment, e.g., the PCB board on which the display may be mounted. The display panel 3 is fixed to the acoustic isolating means using a first fixing means 9, like hooks, to the left and to the right side of the display panel 3. Additional hooks are also provided on the front and back side edges of the display panel 3, although not shown in FIG. 1. The hooks 9 may extend over the entire length of the display edges, or one or more individual hooks may be distributed over the edges of the display panel 3. The hooks 9 do not only limit the movement of the display panel 9 in the display plane but also perpendicular to it by providing a hook 9 with a clearance matching the thickness of the display panel 3. Instead of hooks 9, also other shapes, like clamps or brackets, may be used to fix the display panel 3. The dimension of the first fixing means 9 may be chosen such that the display panel 9 frictionally engages with the first fixing means 9.

The acoustic isolating means 7 furthermore comprises one or more recess regions of holes 5 to accommodate the acoustic wave sensing means 5.

In this embodiment, the acoustic isolating means 7 covers the entire backside of the display panel 3, except for the recesses 11 and even projects laterally further out to provide an area 13 with secondary fixing means 15, here in the form of through holes, which may receive screws 17, clips, rivets, or the like, which may be used to attach the touch sensitive display 1 to a printed circuit board (PCB) 19. The PCB 19 may comprise the electronic components used to analyze the signals sensed by the acoustic wave sensing means 5. For this purpose, the acoustic wave sensing means 5 may be connected to PCB 19 using connections 21 soldered to the PCB 19 at connecting positions 23.

According to embodiments of the invention, the acoustic isolating means 7 may not only provide the acoustic isolation, but may furthermore protect the assembly. This may be achieved by using a material like silicone. In the first embodiment, the acoustic isolating means 7 is a molded workpiece. The thickness of the silicone acoustic isolating means 7 may be chosen such that shocks and bending constraints which may occur in normal use may be absorbed. By placing the display panel 3 with its backside on the silicone workpiece, an unwanted deflection of the display panel 3 may be prevented such that a breakage of the display panel, which may comprise glass plates, may be reduced.

Silicone is furthermore a material that keeps its acoustic properties of dynamic stiffness (within 2%) and damping ratio (within 2 pp) in a temperature range corresponding to a temperature range of −25° C. to 85° C., corresponding to the range in which the touch sensitive panels 1 may be designed for use. For some applications, a temperature range of 0° C. to 50° C. may be sufficient. Furthermore, such a material when brought into a suitable shape, like in this case, may also satisfy the requirement of a damping ratio of 5% or less. As a consequence, a negative influence of the properties of the acoustic waves traveling in the display panel 3 may be prevented, and, thus, an algorithm to identify touch positions may not have to take into account temperature variations to reliably identify the touch positions.

In a variant of this embodiment, the silicone material may be shaped as a two- or three dimensional spacer textiles. This kind of shaped material, like for instance spacer textiles commercialized under the trade name Deflexion™ of Dow Corning Inc., may reduce the weight of the acoustic isolating means 7 without reducing its stiffness. A particular advantage of this kind of material may be that, due to the special three dimensional shape, forces perpendicular to the display panel 3 are distributed into the plane of the textile so that the display panel 3 does not move under the impact of a user's touch.

Figure 2:
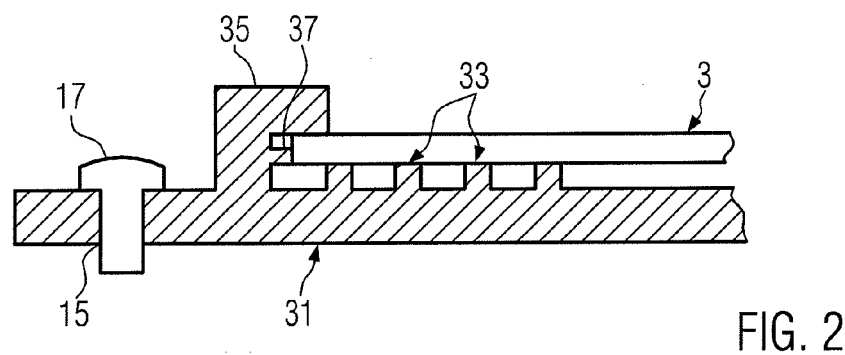
FIG. 2 illustrates a schematic partial side cut view of a touch sensitive display according to a second embodiment.

FIG. 2 illustrates a schematic partial side cut view of a touch sensitive display according to a second embodiment of the invention. In this embodiment, elements having the same reference numerals as used in the description of the first embodiment of FIG. 1 will not be described in detail again, but reference is made their detailed description above.

In this second embodiment of FIG. 2, the surface of the acoustic isolating means 31 comprises a plurality of bumps or spikes 33 on the surface facing the back main surface of the display panel 3. The bumps or spikes may be made of a material that has mechanical properties stable in temperature, such as silicone. Once fixed by the first fixing means 35, the display panel is pressed against the top surfaces of the bumps 33.

FIG. 2 only shows an edge region of the touch sensitive display. The bumps 33 may be present over the entire surface facing the back main side of the display panel 3. According to a variant embodiment, the bumps may only be present in the edge region, like illustrated, and, in addition, one or more bumps 33 could be present in the center region to prevent the bending of the display panel 3 under a user's touch in the center region of the display panel 3.

To further limit the total contacting surface between the display panel 3 and the acoustic isolating means 31, the first fixing means 35 of the second embodiment may comprise one or more bumps 37. The first fixing means 35 and the bumps 37 may be made out of silicone.

In this embodiment, the remaining parts of the acoustic isolating means not in contact with the display panel 3 may be made out of a material different than silicone. Namely, a metal, like aluminum for its low weight, or a rigid plastic, like Polycarbonate or PEEK, may be used to stiffen the assembly.

Also in this embodiment the design may be such that the desired dynamic stiffness and damping may be achieved throughout the desired temperature range.

Figure 3:
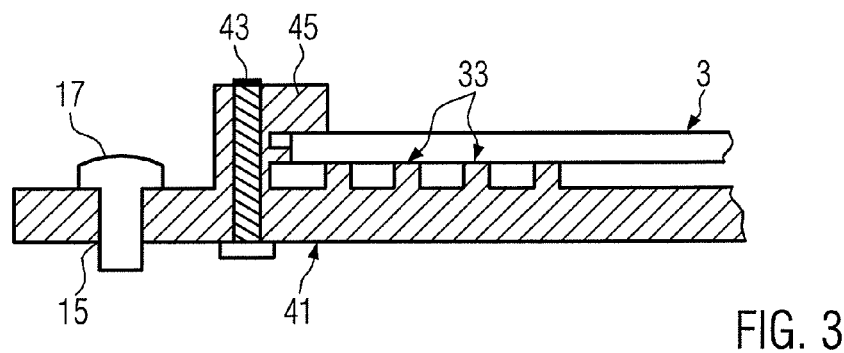
FIG. 3 illustrates a schematic partial side cut view of a touch sensitive display according to a third embodiment.

FIG. 3 illustrates a schematic partial side cut view of a touch sensitive display according to a third embodiment of the invention fixed to a PCB. In this third embodiment elements having the same reference numerals as used in the description of the first or second embodiment will not be described in detail again, but reference is made their detailed description above.

The third embodiment of FIG. 3 represents a variant of the second embodiment. The acoustic isolating means 41 of the third embodiment essentially corresponds to the one of the second embodiment. The difference relates to the first fixing means 45 which comprises a spacer 43. The spacer 43 is positioned inside the first fixing means 45 and is made out of a rigid material, like metal, PEEK, or polycarbonate. The upper extremity of the spacer 43 in this embodiment extends beyond the front main side of the display panel 3. Its function is to ensure the outer dimension of the touch sensitive display panel. Indeed, a frame of a housing of an electronic device comprising the touch sensitive display panel will come to rest on the spacer 43. As the spacer 43 may be produced with rather small tolerances of, for instance, 0.1 mm or smaller, electronic devices with an attractive, high quality visual aspect may be produced.

According to a variant, the spacers may also be positioned outside the first fixing means 45, e.g. in between two first fixing means 45. In a further variant, the spacers may be attached to the side of the first fixing means.

Also in this embodiment the design is such that the desired dynamic stiffness and damping may be achieved throughout the desired temperature range.

Figure 4:
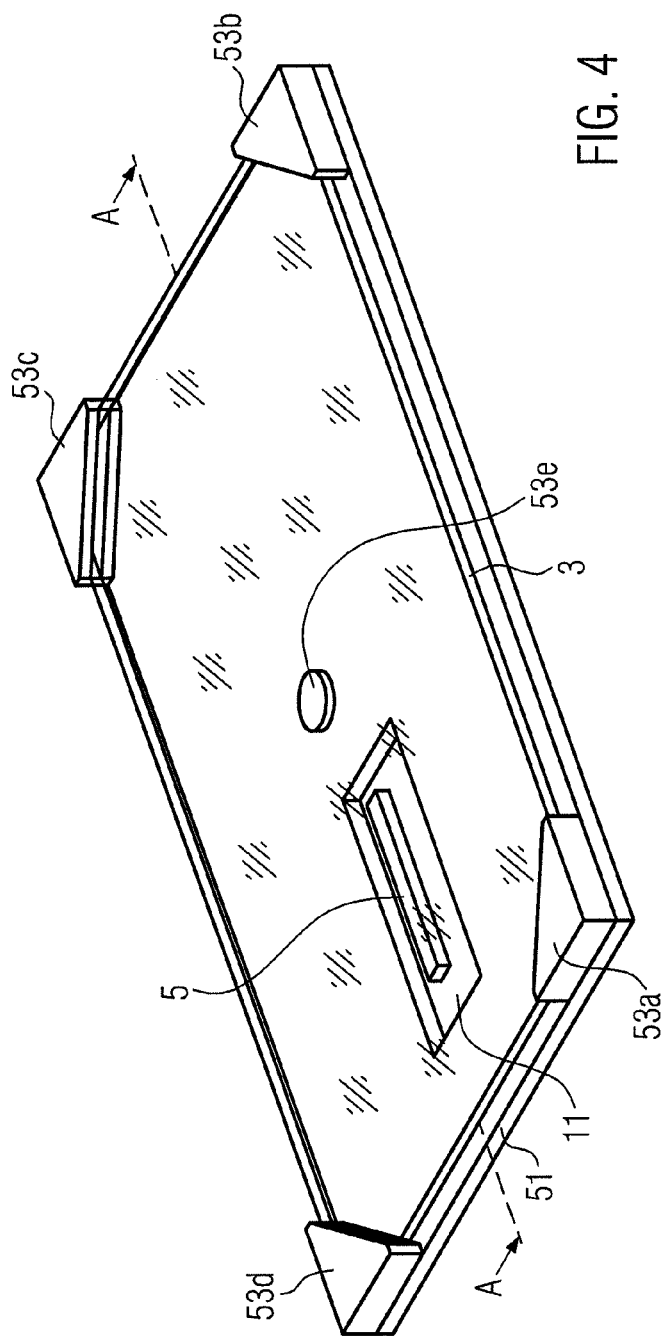
FIG. 4 illustrates a schematic three dimensional view of a touch sensitive display according to a fourth embodiment.

FIG. 4 illustrates a schematic three dimensional view of a touch sensitive display according to a fourth embodiment of the invention. In this fourth embodiment elements having the same reference numerals as used in the description of the first to third embodiment will not be described in detail again, but reference is made their detailed description above.

In this fourth embodiment of FIG. 4, the acoustic isolating means is built up by a plate 51, e.g. made out of a metal, like aluminum, polycarbonate, or PEEK, and attached to it are four first fixing means 53a to 53d receiving the corners of the display panel 3. The first fixing means 53a to 53d are made of silicone to provide acoustic isolation, whereas the plate 51 serves as the stiffening element. Like in the first embodiments, the plate 51 comprises a recess or hole 11 to receive the acoustic wave sensing means 5. Depending on the number of acoustic wave sensing means 5, the plate 51 may comprise more than one recess.

To prevent the display panel 3 from flexing downward upon a user's touch in the central region of the display panel 3, the acoustic isolating means of the fourth embodiment furthermore comprises a bump 53e in the central area. Instead of providing only one bump 53e like illustrated, more than one bump may be provided, such as equally distributed over the surface of plate 51. The bump may be made out of silicone, like the corner elements of the first fixing means 53a to 53d.

Additional first fixing elements may also be provided in the edge region of the display panel 3 between two corner elements 53a to 53d to further limit unwanted movements of the display panel 3 upon touch inputs by a user.

Also in this embodiment the design is such that the desired dynamic stiffness and damping may be achieved throughout the desired temperature range.

Figure 5:
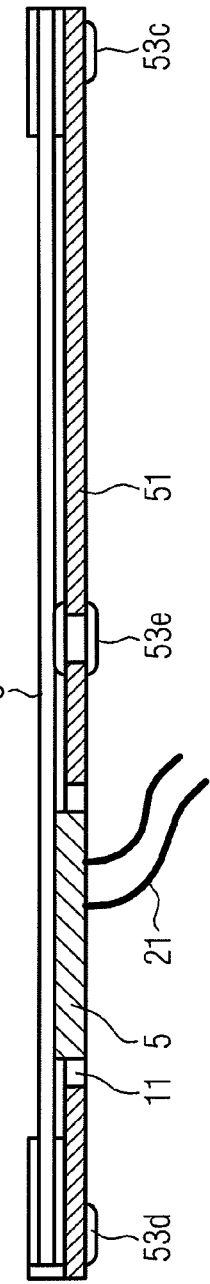
FIG. 5 illustrates a schematic side cut view of the touch sensitive display according to the fourth embodiment.

FIG. 5 illustrates a schematic side cut view of the touch sensitive display according to the fourth embodiment. This view illustrates that the corner elements of the first fixing means 53a to 53d are fixed to the plate 51 by pushing a plugging element through a corresponding hole in the plate 51. As the plugging element has a larger diameter at its extremity than the hole in the plate, once pushed through the hole, the corner elements of the fixing means 53a to 53d cannot be removed unintentionally. The bump 53e is also fixed to the plate 51 by pushing a plugging element through a corresponding hole in the plate 51. Thus no gluing step is necessary to attach these elements to the plate 51.

Like in the third embodiment, the corner elements may comprise spacers 43 and/or such spacers 43 may protrude perpendicular to plate 51. In this case the size of the plate 51 would no longer match the size of the display panel 3 but would laterally extend beyond the edges of the display panel 53.

The side cut view furthermore illustrates that the display panel 3 is fitted into the recesses of the corner elements of the first fixing means such that the display panel cannot move in the plane of the display panel 3 and perpendicular to that plane.

Figure 6:
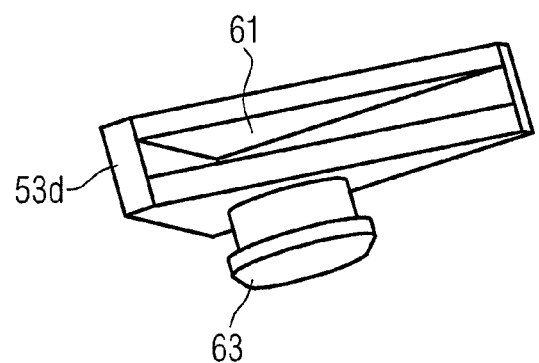
FIG. 6 illustrates a schematic three dimensional view of a fixing means of the touch sensitive display according to the fourth embodiment.

FIG. 6 illustrates a schematic three dimensional view of a corner element fixing means 53d of the touch sensitive display according to the fourth embodiment. It shows the corner element with the recess 61 for receiving the corner of the display panel 3 and the plugging element 63 with its enlarged extremity for fixing it to the plate 51.

According to a variant, the interior of the recess 61 may comprise bumps or spikes to further reduce the contact surface between the acoustic isolating means and the display panel 3.

The various features of the first to fourth embodiment may be combined individually or in combination with each other without any limitation.

Figure 7:
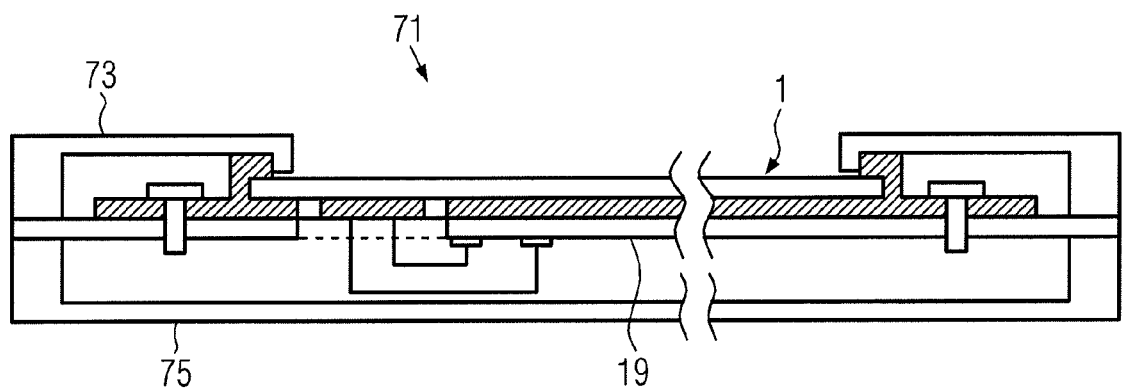
FIG. 7 illustrates a schematic side cut view of an electronic device according to a fifth embodiment and comprising a touch sensitive display according to one of the first to third embodiment.

FIG. 7 illustrates a schematic side cut view of an electronic device 71 according to a fifth embodiment of the invention, which comprising a touch sensitive display 1 according to one of the first to third embodiments. As a variant, not shown, the touch sensitive display according to the fourth embodiment could also be used in the electronic device 71.

In FIG. 7 the touch sensitive display 71 with the PCB board 19 is sandwiched between a cover frame 73 covering the border region of the display panel and a housing part 75 covering the backside of the PCB board 19. The cover frame 73 as well as the housing part 75 may be attached to the PCB board by screws. As an alternative, the cover frame 73 and the housing part 75 may be attached to each other using screws and the PCB board 19 and or the touch sensitive display 1 may be attached to either one of the cover frame 73 or the housing part 75 by screws. The use of screws has the advantage that the device may be easily assembled but also easily dissembled in case the display has to be exchanged.

When the touch sensitive display is according to the third embodiment, the cover frame may be fixed to the PCB 19 such that it is forced into contact with the spacers 43. Thereby even though the tolerances of the cover frame 73 typically being of the order of 0.6 mm are rather high, the outside dimensions of the electronic device may be controlled by size of the spacers 43, which typically have a tolerance in the order of 0.1 mm. This improves the quality of the visual aspect, which will be appreciated by the user.

Figure 8:
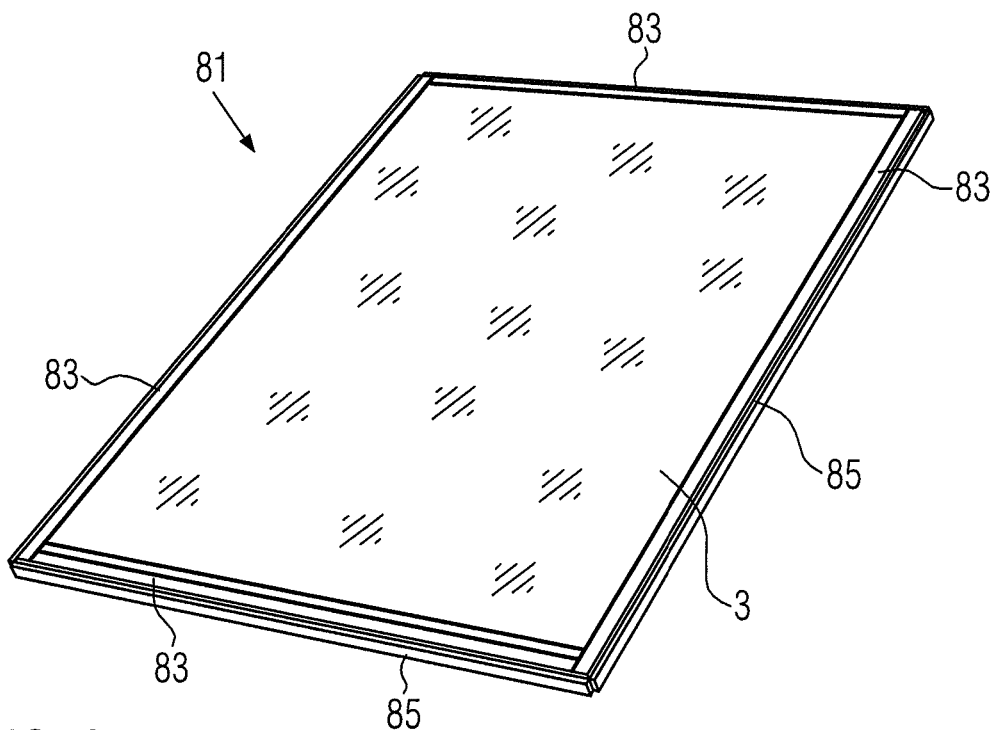
FIG. 8 illustrates a schematic view of a touch sensitive display according to a sixth embodiment of the invention.
Figure 9:
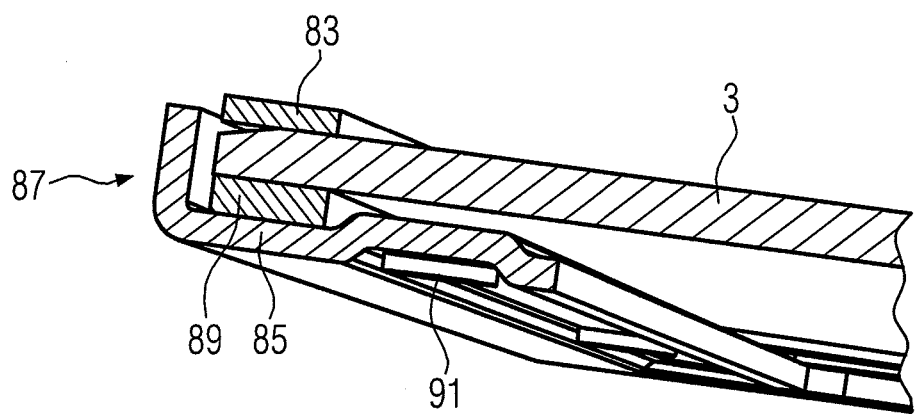
FIG. 9 illustrates an enlarged view of an edge region of the touch sensitive display according to the sixth embodiment.

FIGS. 8 and 9 illustrate a touch sensitive display 81 according to a sixth embodiment of the invention. Elements having the same reference numeral as in previous embodiments will not be described in detail again but a reference is made to their detailed description above. In this embodiment the display panel 3 has an acoustic isolation means in a first region 83 on the front side of the display 3, the front side again being the displaying side, and in a second region 89 on the backside of the display 3. The acoustic isolation means on the back side in the second region 89 is attached to a frame 85 extending around the circumference of the display panel 3. The frame 85 may be fixed to a stiffening element or the PCB board 19 using fixing means 91, e.g. holes for screws like illustrated in FIG. 1 or an adhesive tape.

In this sixth embodiment of FIGS. 8 and 9, the acoustic isolating means in the first and second regions 83 and 89 may be a silicone foam with an adhesive to attach it to the front and back side of the display panel. Silicone foams like the silicone foams as distributed under the trade name Bisco® of Rogers Corporation in particular the reference HT800 are stable in temperature, at least in the temperature ranges in which consumer electronic devices are used. The frame 83 may be made of aluminum, magnesium, polycarbonate, or PEEK. The frame may be a single piece or made up of several elements. Instead of completely extending around the frame, the frame may be interrupted comparable to the arrangement shown in FIG. 4. In this case an additional stiffening element may be necessary.

The frame 85 extends laterally beyond the edges of the display panel 3 and forms a compression controlling means as described in claim 18. A cover frame 73 as shown in FIG. 7, may be forced to a rest on the extremity of the side wall 87 of the frame 85 and thereby compress the acoustic isolation means in the first region 83 and the second region 89 in a predetermined way. This is for instance achieved when the frame 85 is fixed to a PCB board 19, and the cover frame 73 is screwed onto the PCB board.

Using the compression controlling means 87, the foam material may be compressed by a predetermined amount in a repeatable way so that for a plurality of fabricated devices the thickness of the foam in the compressed state is essentially constant, at least within the fabrication tolerances of the frame 85 and the cover frame 73. Also in this embodiment the design is such that the desired dynamic stiffness and damping may be achieved throughout the desired temperature range.

Figure 10:
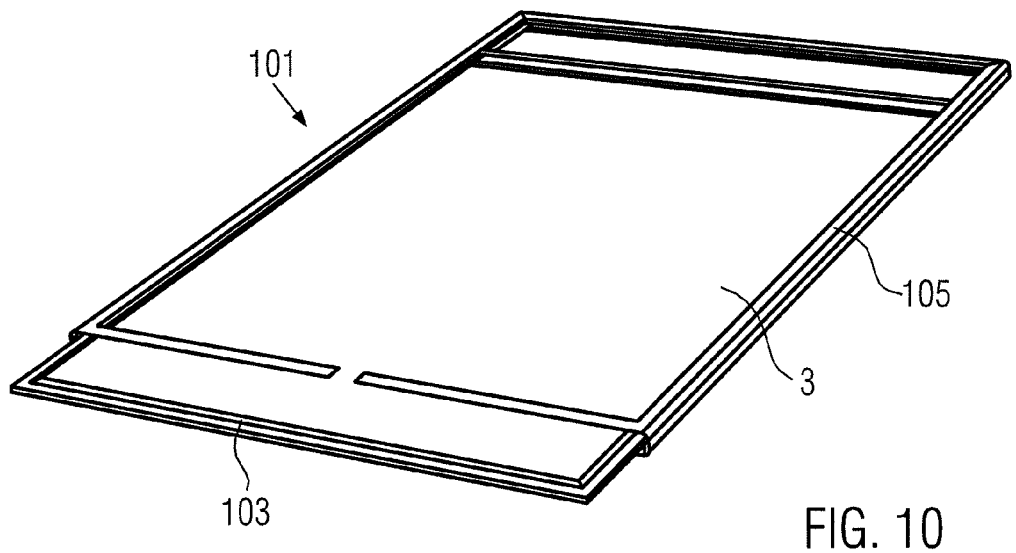
FIG. 10 illustrates a schematic view of a touch sensitive display according to a seventh embodiment of the invention.
Figure 11B:
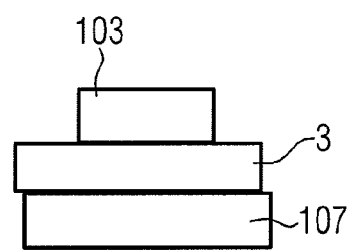
FIGS. 11a and 11b illustrate an enlarged view of an edge region of the touch sensitive display according to the sixth embodiment with and without a frame.
Figure 11A:
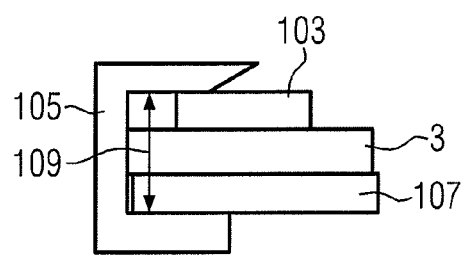

FIGS. 10 and 11a and 11b illustrate a schematic view of a touch sensitive display 101 according to a seventh embodiment of the invention which is a variant of the sixth embodiment. Elements having the same reference numeral as in previous embodiments will not be described in detail again but a reference is made to their detailed description above.

In this seventh embodiment of FIGS. 10 and 11a and 11b, the acoustic isolating means is also provided in a first region 103 and a second region 107 on the front and backside of the display panel 3. The acoustic isolating means is provided along the edge on the front and back sided of the display. Like in the sixth embodiment a silicone foam is used as acoustic isolator.

To ensure the predefined compression the display panel 3 with its acoustic isolation means is introduced, e.g. by sliding, into a housing shell 105 with a predetermined clearance 109 inside. Thus, when fully introduced, the thickness of the two foam regions adapts to the clearance. In this way no adhesive is necessary to fix the acoustic isolating means, which improves the temperature stability of the assembly. Also in this embodiment, the design is such that the desired dynamic stiffness and damping may be achieved throughout the desired temperature range.

The electronic device may be any device, in particular any mobile and/or handheld device, an E-reader, a mobile or smart phone, a PDA, etc.

The experimental determination of the mechanical parameters damping ratio and dynamic stiffness, which should remain stable in the predetermined temperature range, may be measured using a transmissibility measurement.

Figure 12:
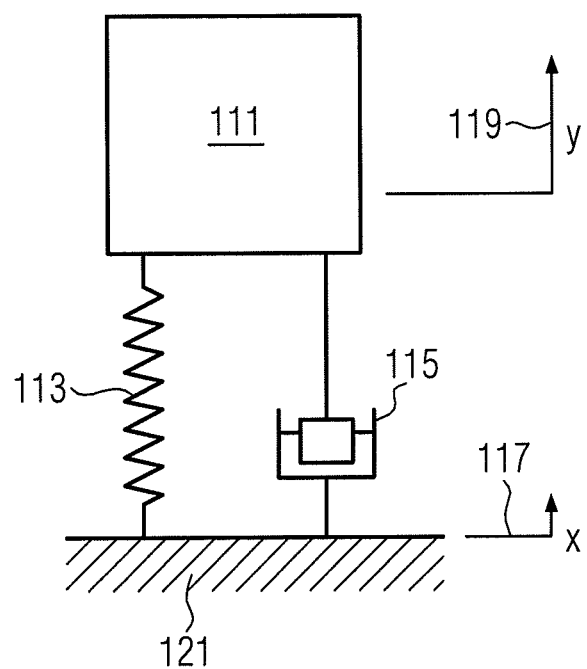
FIG. 12 illustrates schematically how to determine the dynamic stiffness and the damping ratio.

Transmissibility is defined as the ratio of a vibration 119 transmitted after isolation to the disturbing vibration 117 of a host structure. The experimental measurement of the transmissibility enables the determination of the dynamic stiffness and damping ratio of an acoustic isolation means. An acoustic isolation means may be modelled as a single degree of freedom mass 111—spring 113—damper 115 system as illustrated in FIG. 12, with the host structure 121 from where the vibration 119 is introduced.

The theoretical transmissibility of this system may be written as follows:

$$T = \frac{y}{x} = \sqrt{\frac{1 + 4\xi^2\left(\frac{f}{f_0}\right)^2}{\left[1 - \left(\frac{f}{f_0}\right)^2\right]^2 + 4\xi^2\left(\frac{f}{f_0}\right)^2}} \quad \text{Eq. 1}$$

where $\xi$ is the damping ratio and $f_0$ is the resonance frequency.

The dynamic stiffness k is determined from the expression of the resonance frequency:

$$f_0 = \frac{1}{2\pi}\sqrt{\frac{k}{m}} \quad \text{Eq. 2}$$

where m is the mass 111 supported by the spring 113 and the damper 115, which may be measured or known.

Maximum transmissibility of an acoustic isolating means occurs at resonance when the ratio of the disturbing frequency to the natural frequency is equal to 1 (i.e., $f/f_0=1$). The damping ratio is determined from the expression of the transmissibility at resonance:

$$T = \frac{1}{2\xi} \quad \text{Eq. 3}$$

Transmissibility measurement may be repeated at different temperatures depending on the desired functional temperature range.

With the inventive touch sensitive panel according to the embodiments as described above, it becomes possible to provide the necessary acoustic isolation to be able to reliably determine the position of a user's touch location while at the same time ensuring a stable positioning of the display with respect to the remaining part of the electronic device. Finally, by choosing a thermoset material like silicone, it is furthermore possible to provide mechanical stability of the acoustic isolating means in the desired temperature range. Thus, the algorithms used to determine the touch position do not need to take into account temperature. The design is advantageous for a mass produced device as touch positions determining algorithm does not have to be calibrated for each device.

The invention claimed is:

1. A touch sensitive display for integration into an electronic device configured to function in a predetermined temperature range, wherein the touch sensitive display comprises:
   a display panel,
   at least one acoustic wave sensing component, and
   an acoustic isolating component wherein the acoustic isolating component is configured and arranged such that it presents a damping ratio of 5% or less, with a variation of this damping ratio of 2 percentage points or less in the predetermined temperature range, and
   wherein the acoustic isolating component is further configured to provide mechanical stiffening of the display panel.

2. The touch sensitive display according to claim 1, wherein the acoustic isolating component is configured and arranged such that its dynamic stiffness has a variation of 2% or less in the predetermined temperature range.

3. The touch sensitive display according to claim 1, wherein the predetermined temperature range is at least from 0° C. up to 50° C.

4. The touch sensitive display according to claim 1, wherein the acoustic isolating component comprises:
   an elastic material in a first region on the front side of the display panel, with the front side of the display panel being the displaying side,
   an elastic material in a second region on the back side of the display panel, and wherein the elastic materials in the first region and second region are further configured to provide mechanical stiffening of the display panel, and
   a compression controlling component for compressing at least one of the first and second region by a predetermined amount.

5. The touch sensitive display according to claim 4, wherein the compression controlling component is a frame attached to the acoustic isolating component in the first or second region and extending at least partially beyond the edge of the display panel.

6. The touch sensitive display according to claim 5, wherein the compression controlling component is part of a housing shell into which the display panel with the acoustic isolating component and the acoustic wave sensing component is positioned such that the first and second region get compressed in a predetermined way.

7. The touch sensitive display according to claim 6, wherein the acoustic isolating component in the first region and in the second region is compressed between the housing shell and the display panel respectively without being attached to the display panel.

8. The touch sensitive display according to claim 4, wherein the acoustic isolating component comprises one or more molded parts into which the display panel is frictionally engaged.

9. The touch sensitive display according to claim 4, wherein the size of the acoustic wave sensing component essentially at least matches the size of the back side of the display panel, with the front side of the display panel being the displaying side, and comprises one or more recess regions or holes for accommodating the at least one acoustic wave sensing component which is/are in contact with the back side of the display panel.

10. The touch sensitive display according to claim 1, wherein the acoustic isolating component comprises a fixing component configured to the display panel to the acoustic isolating component.

11. The touch sensitive display according to claim 10, wherein the fixing component is one of a hook, a clamp, or a bracket, and wherein the fixing component is provided at at least one of an edge and a corner of the display panel.

12. The touch sensitive display according to claim 1, wherein the acoustic isolating component comprises a plurality of bumps on the side facing the display panel.

13. The touch sensitive display according to claim 12, wherein the bumps touch the display panel at least in its edge region.

14. The touch sensitive display according to claim 1, wherein the acoustic isolating component is at least partially made out of a silicone material.

15. The touch sensitive display according to claim 1, wherein the acoustic isolating component comprises one or more regions with a two or three dimensional spacer textile.

16. The touch sensitive display according to claim 1, wherein the acoustic isolating component comprises stiffening elements made out of any one of a metal, aluminum, a polycarbonate material, a Polyether ether ketone (PEEK) material, or a combination thereof.

17. The touch sensitive display according to claim 1, further comprising one or more spacers attached to or incorporated into the acoustic isolating component with one extremity of the one or more spacer being flush aligned with the front side of the display panel or protruding perpendicular to the front side of the display panel by a predetermined amount.

18. The touch sensitive display according to claim 17, wherein the one or more spacer is made out of any one of a metal, a polycarbonate material, a Polyether ether ketone (PEEK) material, or a combination thereof.

19. An electronic device comprising:
a touch sensitive display according to claim 1,
a printed circuit board, and
a cover frame fixed to the printed circuit board and enclosing at least the display panel and the acoustic isolating component.

20. The electronic device according to claim 19, wherein the cover frame is in contact with the frame of a compression controlling component to thereby compress a first region and a second region of the acoustic isolating component by the predetermined amount.

21. The electronic device according to claim 19, wherein the touch sensitive display further comprises one or more spacers attached to or incorporated into the acoustic isolating component, with one extremity of the one more spacer being flush aligned with the front side of the display panel or protruding perpendicular to the front side of the display panel by a predetermined amount, and wherein the cover frame touches the extremity/extremities of the one or more spacer.

* * * * *